(12) United States Patent
Langenderfer

(10) Patent No.: US 9,399,849 B2
(45) Date of Patent: Jul. 26, 2016

(54) STABILIZING SUPPORT FOR A DOWNSPOUT EXTENSION

(71) Applicant: Terence Langenderfer, Maumee, OH (US)

(72) Inventor: Terence Langenderfer, Maumee, OH (US)

(*) Notice: Subject to any disclaimer, the term of this patent is extended or adjusted under 35 U.S.C. 154(b) by 0 days.

(21) Appl. No.: 14/309,196

(22) Filed: Jun. 19, 2014

(65) Prior Publication Data

US 2014/0374547 A1 Dec. 25, 2014

Related U.S. Application Data

(60) Provisional application No. 61/837,937, filed on Jun. 21, 2013.

(51) Int. Cl.
| | | |
|---|---|---|
| *E04D 13/08* | (2006.01) | |
| *F16L 3/00* | (2006.01) | |
| *E02D 5/80* | (2006.01) | |
| *E02D 27/50* | (2006.01) | |
| *F16L 3/01* | (2006.01) | |

(52) U.S. Cl.
CPC .......... *E02D 5/80* (2013.01); *E02D 27/50* (2013.01); *E04D 13/08* (2013.01); *E04D 2013/084* (2013.01); *F16L 3/01* (2013.01)

(58) Field of Classification Search
CPC ........... E02D 5/80; E02D 5/801; E04D 13/08; E04D 2013/084; F16L 3/00
USPC ............. 248/48.1, 48.2, 49, 76, 87, 156, 530; 52/16, 155; 239/273, 276; 404/2, 3; 405/120
See application file for complete search history.

(56) References Cited

U.S. PATENT DOCUMENTS

| | | | | |
|---|---|---|---|---|
| 1,711,240 A | * | 4/1929 | Merryweather | ................ 248/71 |
| 3,021,102 A | | 2/1962 | Kuempel | |
| 4,161,302 A | * | 7/1979 | Stuhlman | ........................ 248/49 |
| 4,452,018 A | * | 6/1984 | Hill | ................................ 52/155 |
| D342,016 S | | 12/1993 | Ziegelmann | |
| 5,452,743 A | * | 9/1995 | Rortvedt | ................. E04D 13/08 137/615 |
| 5,573,209 A | * | 11/1996 | Lindquist | ..................... 248/48.2 |
| 8,286,390 B2 | * | 10/2012 | Leahy | ................ 52/16 |
| 2005/0160681 A1 | * | 7/2005 | Boelling | .......................... 52/16 |
| 2014/0284433 A1 | * | 9/2014 | Gazlay | ............................ 248/87 |

OTHER PUBLICATIONS

"Roof Drainage Systems", Product Catalog showing a Downspout Anchor, from the website http://www.amerimax.com/product-catalog, last visited Oct. 20, 2014.

* cited by examiner

*Primary Examiner* — Tan Le
(74) *Attorney, Agent, or Firm* — MacMillan, Sobanski & Todd, LLC

(57) ABSTRACT

A stabilizing support for a downspout extension includes an engagement portion that has a first axis and a second axis. The stabilizing support also includes an attachment portion that is connected to the engagement portion for securing the engagement portion relative to a surface. The attachment portion allows the engagement portion to be secured in one of two orientations, with one of the first axis and the second axis generally perpendicular to the surface.

4 Claims, 6 Drawing Sheets

STABILIZING SUPPORT FOR A DOWNSPOUT EXTENSION

CROSS-REFERENCE TO RELATED APPLICATIONS

This application claims the benefit of U.S. Provisional Application No. 61/837,937, filed Jun. 21, 2013, the disclosure of which is incorporated herein by reference.

BACKGROUND OF THE INVENTION

This invention relates in general to a stabilizer for a fluid conduit. More specifically, this invention relates to a support for stabilizing a downspout extension relative to the ground.

Gutters and downspouts are commonly used on various types of buildings to control precipitation run-off. A residential house, for example, may include a sloped roof that causes rain water to flow to the edge of the structure. Gutters may be positioned below the edges of the roof to collect the rain water, and downspouts may be connected to the gutters at various points. The downspouts allow the water collected in the gutters to flow to a lower elevation, and many downspouts discharge the water onto the ground.

A typical downspout may discharge the collected water a few inches away from the side of the building. In some instances, however, it is desirable to discharge the collected water farther away from the building, such as away from the foundation of the building. This may be done by adding a downspout extension, which may be a conduit that has the same cross-sectional dimensions as the downspout and may be several feet long. The downspout extension may include a hinged connection to the downspout so that the downspout extension may be swung up out of the way when desired.

These downspout extensions may be inadvertently moved out of their desired positions if they are, for example, struck by a strong wind, accidentally kicked by a person, or hit by a lawn mower. Therefore, it is known to use one or more downspout anchors to retain a downspout extension in the desired position. However, it would be desirable to provided an improved support for stabilizing a downspout extension relative to the ground.

SUMMARY OF THE INVENTION

This invention relates to an improved support for stabilizing a downspout extension relative to the ground. The stabilizing support includes an engagement portion that defines a first axis and a second axis. The stabilizing support also includes an attachment portion that is connected to the engagement portion for securing the engagement portion relative to a surface. The attachment portion allows the engagement portion to be secured in one of two orientations relative to the surface, with one of the first axis and the second axis generally perpendicular to the surface. This invention also relates to a stabilizing support for a downspout extension that can engage a surface, such as the ground, to limit movement of the engagement portion in a direction parallel to the first axis and in a direction parallel to the second axis. This invention also relates to a stabilized downspout extension that includes a downspout extension and a stabilizing support. The stabilizing support includes an engagement portion that substantially surrounds a portion of the downspout extension.

Various aspects of this invention will become apparent to those skilled in the art from the following detailed description of the preferred embodiment, when read in light of the accompanying drawings.

DETAILED DESCRIPTION OF THE PREFERRED EMBODIMENTS

Figure 1:
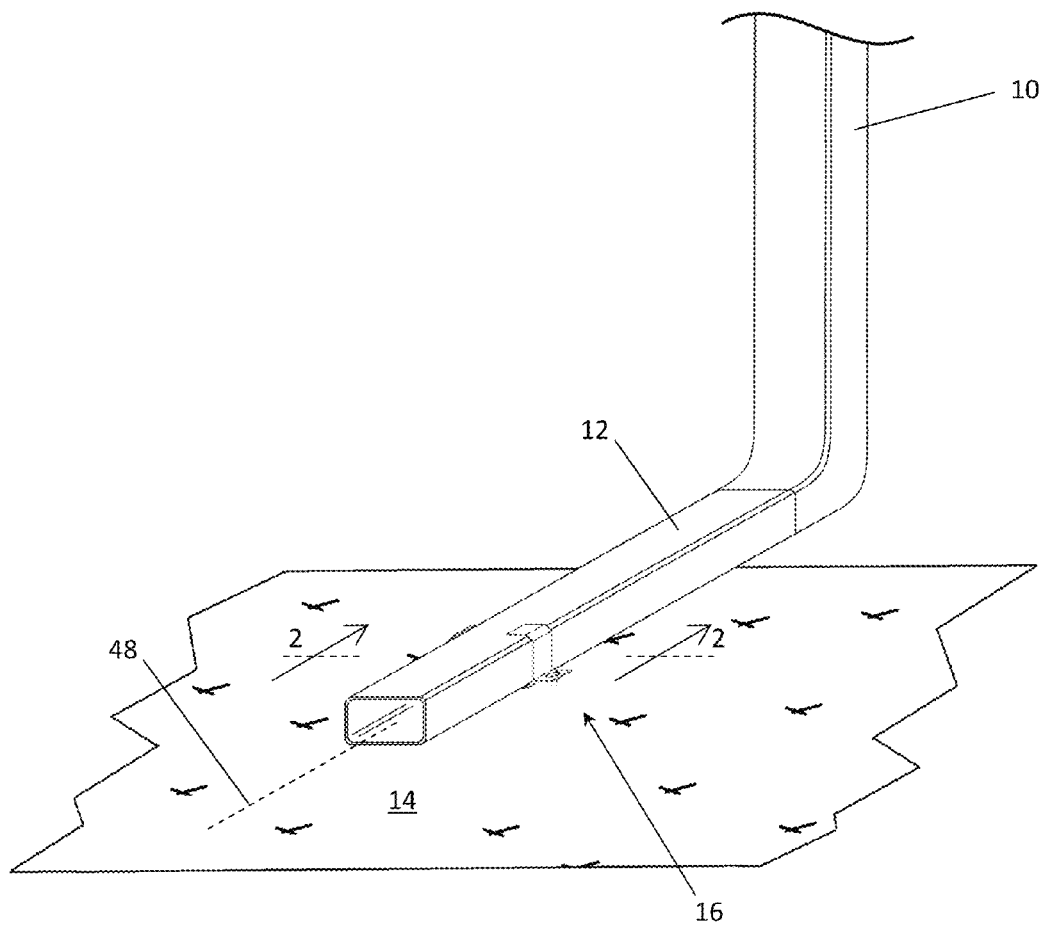
FIG. 1 is a perspective view of a downspout including a downspout extension that is anchored to the ground by a stabilizing support in a first operating orientation in accordance with this invention.

Referring now to the drawings, there is illustrated in FIG. 1 a conventional downspout 10 including a downspout extension 12 that is anchored to the ground 14 by a stabilizing support, indicated generally at 16, in accordance with this invention. The downspout extension 12 may have any desired size, shape, and length to carry water farther from the downspout 10 before the water is discharged onto the ground 14. The illustrated downspout 10 and the downspout extension 12 have generally rectangular cross-sectional shapes, but may have any other desired shape or combination of shapes. The downspout 10, the downspout extension 12, and the stabilizing support 16 may be formed from any desired material or combination of materials, such as aluminum or plastic.

Figure 2:
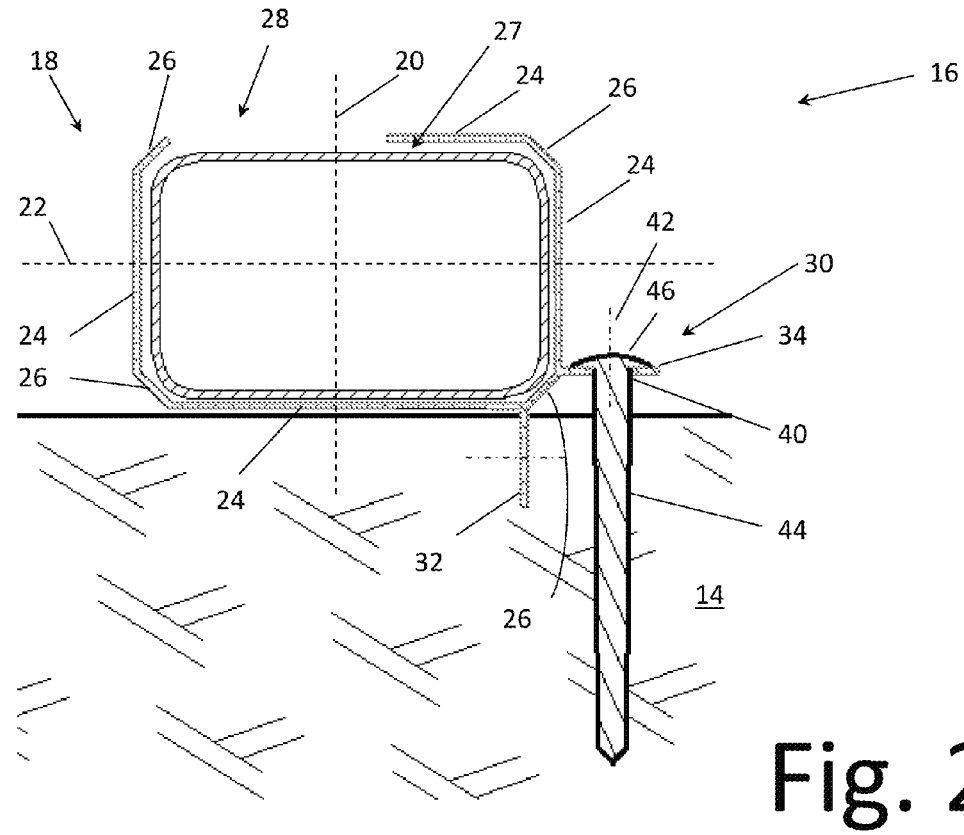
FIG. 2 is cross-sectional view taken along line 2-2 of FIG. 1.
Figure 3:
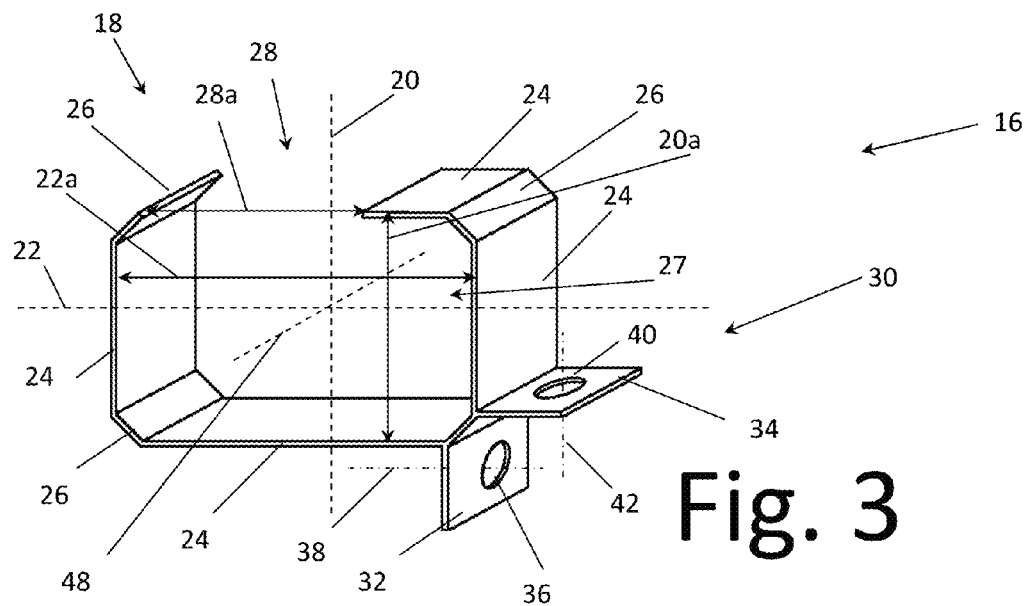
FIG. 3 is a perspective view of the stabilizing support illustrated in FIGS. 1 and 2.

The stabilizing support 16 is provided to help maintain the position of the downspout extension 12 relative to the ground 14. To accomplish this, the stabilizing support 16 engages both the ground 14 and the downspout extension 12 to limit relative movement therebetween. As best shown in FIG. 2, the illustrated stabilizing support 16 includes an engagement portion, indicated generally at 18, that is adapted to selectively engage a portion of the downspout extension 12. The illustrated engagement portion 18 has a generally rectangular cross-sectional shape, defining a first axis 20 and a second axis 22. The first axis 20 may extend generally perpendicular to the second axis 22 as shown. However, the first and second axes 20 and 22 may extend at any other desired orientation relative to one another. As shown in FIG. 3, the illustrated engagement portion 18 has a height 20a along the first axis 20 that is shorter than the width 22a along the second axis 22, although such is not required.

The illustrated engagement portion 18 includes four sides 24 that are connected together by angled portions 26 to substantially define a central space, indicated generally at 27. However, the engagement portion 18 may be embodied having any other desired configuration. For example, the sides 24 may be connected directly to one another without the intervening angled portions 26. Each of the sides 24 of the illustrated engagement portion 18 is formed as a flat, rectangular panel that extends in a longitudinal direction 48. However, some or all of the sides 24 may be formed having other shapes.

As shown in FIG. 2, the central space 27 defined by the engagement portion 18 of the stabilizing support 16 is provided to receive and support the downspout extension 12 therein. Thus, it is desirable that the central space 27 defined by the engagement portion 18 generally conforms to the cross-sectional shape of the downspout extension 12. However, the central space 27 may have any other desired shape. Regardless, the downspout extension 12 is prevented from moving (or at least moving substantially) in either direction along the first axis 20 because of its engagement with one of the sides 24 (the upper and lower sides in FIG. 2) of the engagement portion 18. Similarly, the downspout extension 12 is prevented from moving (or at least moving substantially) in either direction along the second axis 22 because of its engagement with one of the sides 24 (the left and right sides in FIG. 2) of the engagement portion 18.

The engagement portion 18 may, if desired, include an insertion gap, as indicated generally at 28. In the illustrated embodiment, the insertion gap 28 is defined between one of the sides 24 of the engagement portion 18 and the adjacent angled portion 26. However, the insertion gap 28 may be defined at any desired location on the engagement portion 18. The illustrated insertion gap 28 is provided to assist in installing (and removing) the stabilizing support 16 about the downspout extension 12. If the stabilizing support 16 is formed from a resilient material, the sides 24 may be pulled apart to temporarily expand the insertion gap 28 to a size that allows the downspout extension 12 to be inserted therethrough into the central space 27. Thereafter, the stabilizing support 16 is released, allowing the sides 24 and angled portions 26 to return to the positions illustrated in FIG. 2.

As an example, the insertion gap 28 may have a width 28a that is equal to approximately half of the width 22a of the central space 27. Additionally, the width 28a of the insertion gap 28 may be less than the height 20a of the central space 27. However, the width 28a of the insertion gap 28 may be any other desired value.

The illustrated stabilizing support 16 includes an attachment portion, indicated generally at 30, for retaining the stabilizing support 16 at a desired location in the ground 14. If desired, the attachment portion 30 may be integrally formed with the engagement portion 18. Alternatively, the attachment portion 30 may be formed separately from the engagement portion 18 and attached thereto by any desired means. The illustrated attachment portion 30 includes a first tab 32 that, in the illustrated embodiment, extends from the engagement portion 18 in a direction that is generally parallel to the first axis 20. However, the first tab 32 may extend in any other desired direction or combination of directions. The illustrated attachment portion 30 also includes a second tab 34 that, in the illustrated embodiment, extends from the engagement portion 18 in a direction that is generally parallel to the second axis 22. However, the second tab 34 may extend in any other desired direction or combination of directions. Thus, in the illustrated embodiment, the first tab 32 and the second tab 34 extend generally perpendicularly to each other.

As best shown in FIG. 3, the first tab 32 has a first retaining structure provided thereon. In the illustrated embodiment, this first retaining structure is a first hole 36 that extend through the first tab 32 and defines a first attachment axis 38. The illustrated first attachment axis 38 extends generally parallel to the second axis 22, although such is not required. Similarly, the second tab 34 has a second retaining structure provided thereon. In the illustrated embodiment, this second retaining structure is a second hole 40 that extend through the second tab 34 and defines a second attachment axis 42. The illustrated second attachment axis 42 extends generally parallel to the first axis 20, although such is not required. The first hole 36 and the second hole 40 may have circular cross-sectional shapes as shown, or may have any other desired cross-sectional shape or combination of shapes.

FIGS. 1 and 2 show the stabilizing support 16 secured to the ground 14 in a first operating orientation. In this first operating orientation, the first tab 32 is inserted into the ground 14 so as to limit movement of the stabilizing support 16 relative thereto. When the illustrated first tab 32 is inserted into the ground 14, the illustrated second tab 34 extends generally parallel to the surface of the ground 14. This allows a stake 44 or other retaining mechanism to be inserted through the second hole 40 provided on the second tab 34 into the ground 14 to secure the stabilizing support 16 to the ground 14. The illustrated stake 44 has a head 46 that is somewhat larger than the second hole 40 so that the second tab 34 engages the head 46 of the stake 44 to secure the stabilizing support 16 to the ground 14 in the first operating orientation. As a result, the stake 44 prevents the stabilizing support 16 from moving relative to the ground 14 in either (1) a direction that is parallel to the second attachment axis 42 or (2) a direction that is perpendicular to the ground 14.

Figure 4:
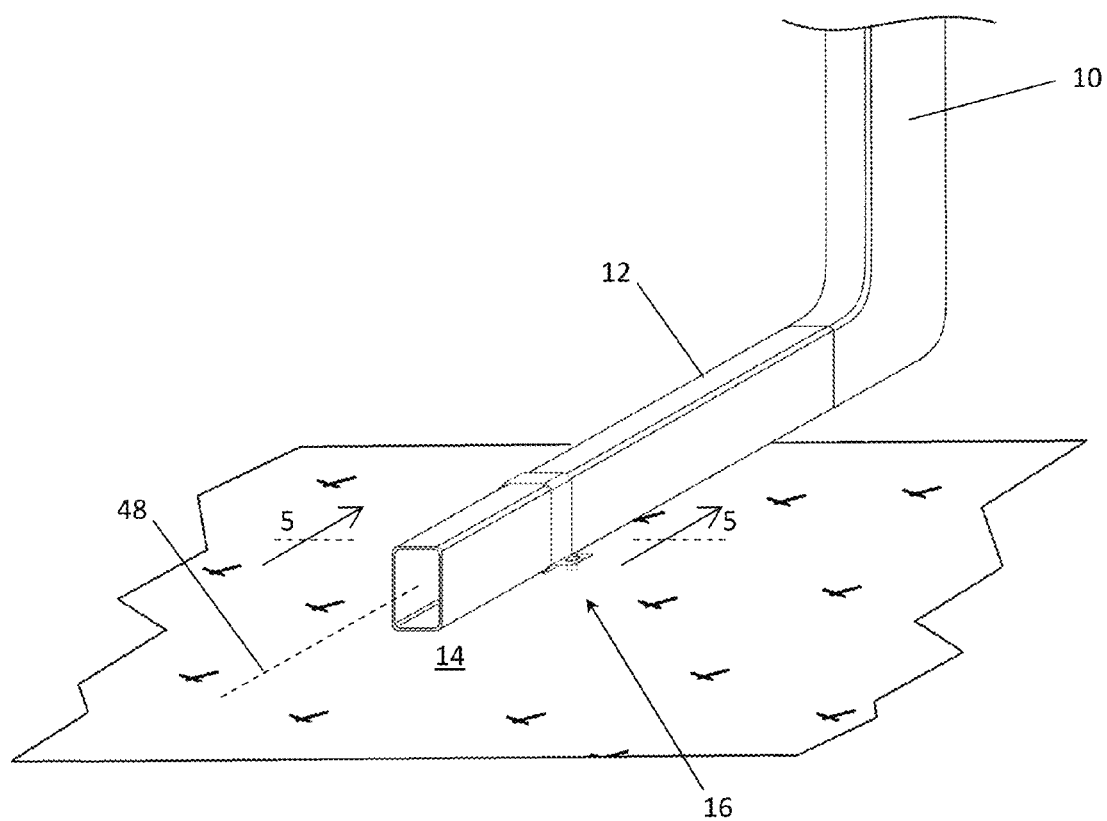
FIG. 4 is a perspective view similar to FIG. 1 showing the stabilizing support of this invention in a second operating orientation.
Figure 5:
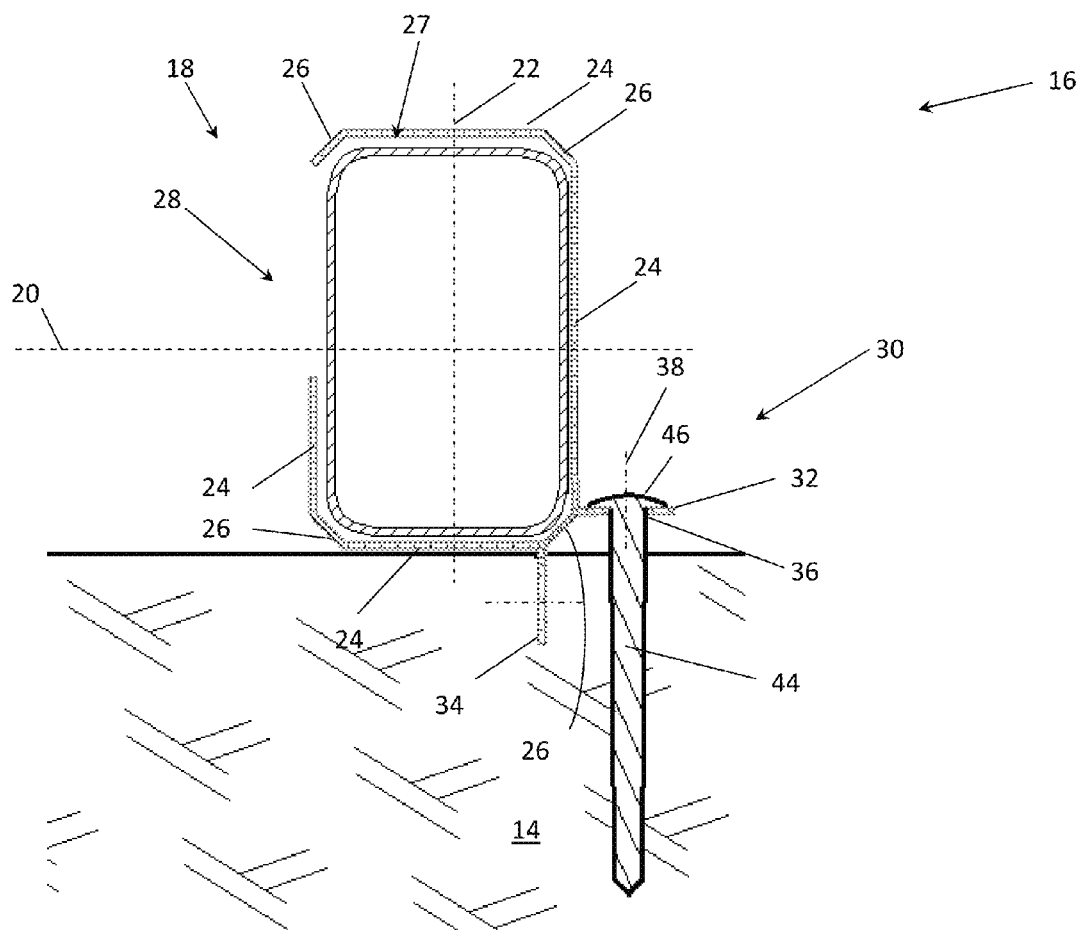
FIG. 5 is a cross-sectional view taken along line 5-5 of FIG. 4.

FIGS. 4 and 5 show the stabilizing support 16 secured to the ground 14 in a second operating orientation. In this second operating orientation, the second tab 34 is inserted into the ground 14 so as to limit movement of the stabilizing support 16 relative thereto. When the illustrated second tab 34 is inserted into the ground 14, the first tab 32 extends generally parallel to the surface of the ground 14. This allows the stake 44 or other retaining mechanism to be inserted through the first hole 36 provided on the first tab 32 into the ground 14 to secure the stabilizing support 16 to the ground 14. The first tab 32 engages the head 46 of the stake 44 to secure the stabilizing support 16 to the ground 14 in the second operating orientation. As a result, the stake 44 prevents the stabilizing support 16 from moving relative to the ground 14 in either (1) a direction that is parallel to the second attachment axis 42 or (2) a direction that is perpendicular to the ground 14.

Figure 6:
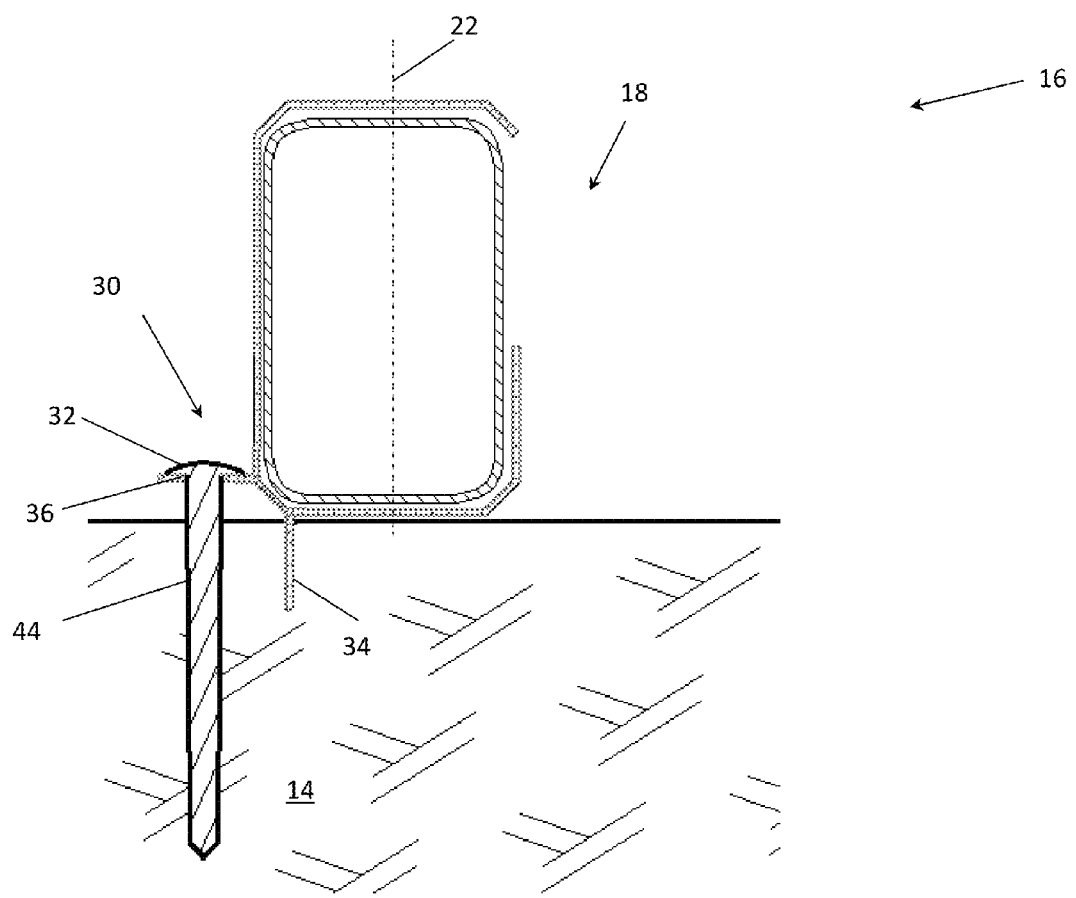
FIG. 6 is a cross-sectional view similar to that shown in FIG. 5, but with the stabilizing support rotated about an axis in order to position a tab on an opposite side of the downspout extension.

Thus, the stabilizing support 16 may be anchored to the ground 14 in either of two operating orientations, namely, (1) with the shorter first axis 20 defined by the downspout extension 12 extending generally perpendicular to the ground 14 or (2) with the longer second axis 22 defined by the downspout extension 12 extending generally perpendicular to the ground 14. This flexibility facilitates the quick and easy installation of the stabilizing support 16 with downspout extensions 12 that are oriented in either of the manners shown in FIGS. 1 and 4. Additionally, it should be appreciated that the stabilizing support 16 may be oriented at any desired location relative to the downspout extension 12 in the longitudinal direction 48. As shown by comparing FIG. 5 and FIG. 6, it should also be appreciated that the illustrated stabilizing support 16 may be installed on downspout extension 12 with the first tab 32 on either desired side of the downspout extension 12. In the illustrated second operating orientation, this is done by rotating the stabilizing support 16 about the second axis 22. It may be desirable to rotate the stabilizing support for reasons including to change the location of the stake 44 in the ground 14, or for aesthetic purposes.

Figure 7:
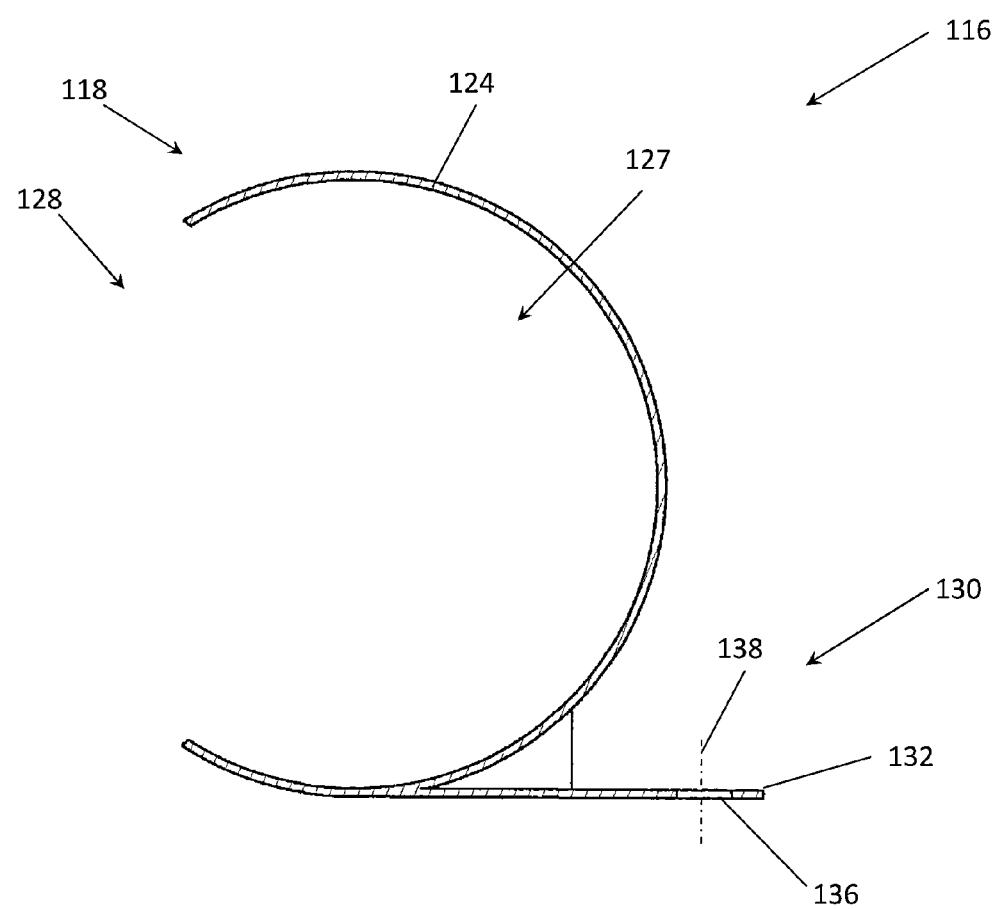
FIG. 7 is a cross-sectional view of an alternative stabilizing support in accordance with this invention.

Referring to FIG. 7, there is shown a cross-sectional view of an alternative stabilizing support in accordance with this invention, indicated generally at 116. The alternative stabilizing support 116 is configured to stabilize an alternative downspout extension (not shown) having a circular cross-sectional shape. The illustrated alternative stabilizing support 116 includes an engagement portion, indicated generally at 118, that is adapted to selectively engage a portion of the alternative downspout extension.

The illustrated engagement portion 118 includes a circular side 124 substantially defines a central space, indicated generally at 127. However, the engagement portion 118 may be embodied having any other desired configuration. For example, the engagement portion 118 may have a plurality of straight sides. The side 124 of the illustrated engagement portion 118 is formed as a cylindrical tube that extends in a longitudinal direction (perpendicular to the view shown in FIG. 7). However, the side 124 may be formed having other shapes.

The engagement portion 118 may, if desired, include an insertion gap, as indicated generally at 128. The illustrated insertion gap 128 is provided to assist in installing (and removing) the alternative stabilizing support 116 about the alternative downspout extension. If the stabilizing support 116 is formed from a resilient material, the side 124 may be pulled apart to temporarily expand the insertion gap 128 to a size that allows the alternative downspout extension to be inserted therethrough into the central space 127. Thereafter, the stabilizing support 116 is released, allowing the side 124 to return to the position illustrated in FIG. 7.

The illustrated alternative stabilizing support 116 includes an attachment portion, indicated generally at 130, for retaining the alternative stabilizing support 116 at a desired location in the ground. If desired, the attachment portion 130 may be integrally formed with the engagement portion 118. Alternatively, the attachment portion 130 may be formed separately from the engagement portion 118 and attached thereto by any desired means. The illustrated attachment portion 130 includes a tab 132 that, in the illustrated embodiment, extends from the engagement portion 118 in a direction that is generally tangent to the side 124. However, the tab 132 may extend in any other desired direction or combination of directions.

The tab 132 has a first retaining structure provided thereon. In the illustrated embodiment, this first retaining structure is a hole 136 that extend through the tab 132 and defines an attachment axis 138. The hole 136 may have a circular cross-sectional shape, or may have any other desired cross-sectional shape.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A stabilized downspout extension comprising:
   a downspout extension extending in a longitudinal direction; and
   a stabilizing support comprising an engagement portion substantially surrounding a longitudinally extending portion of the downspout extension and an attachment portion connected to the engagement portion, the attachment portion including a first tab that extends from the engagement portion and includes a first hole that passes therethrough and a generally perpendicular second tab that extends from the engagement portion and includes a second hole that passes therethrough;
   wherein the engagement portion is secured relative to the surface with the first axis generally perpendicular to the surface by a stake passed through the second hole and the engagement portion is alternatively secured relative to the surface with the second axis generally perpendicular to the surface by the stake passed through the first hole.

2. The stabilized downspout extension of claim 1, wherein the engagement portion includes a first axis and a generally perpendicular second axis and wherein the attachment portion engaged with a surface to limit movement of the downspout extension in a direction parallel to the first axis and in a direction parallel to the second axis.

3. The stabilized downspout extension of claim 2, wherein the attachment portion may engage the surface with one of the first axis and the second axis generally perpendicular to the surface.

4. The stabilized downspout extension of claim 1, wherein the engagement portion includes a first axis and a generally perpendicular second axis and wherein the attachment portion is adapted to secure the engagement portion relative to the surface with the first axis generally perpendicular to the surface and alternatively secure the engagement portion relative to the surface with the second axis generally perpendicular to the surface.

\* \* \* \* \*